July 22, 1958 — E. E. SCHAEFER — 2,844,047
BICYCLE HANDLE BAR GUARD
Filed March 25, 1954 — 3 Sheets-Sheet 1
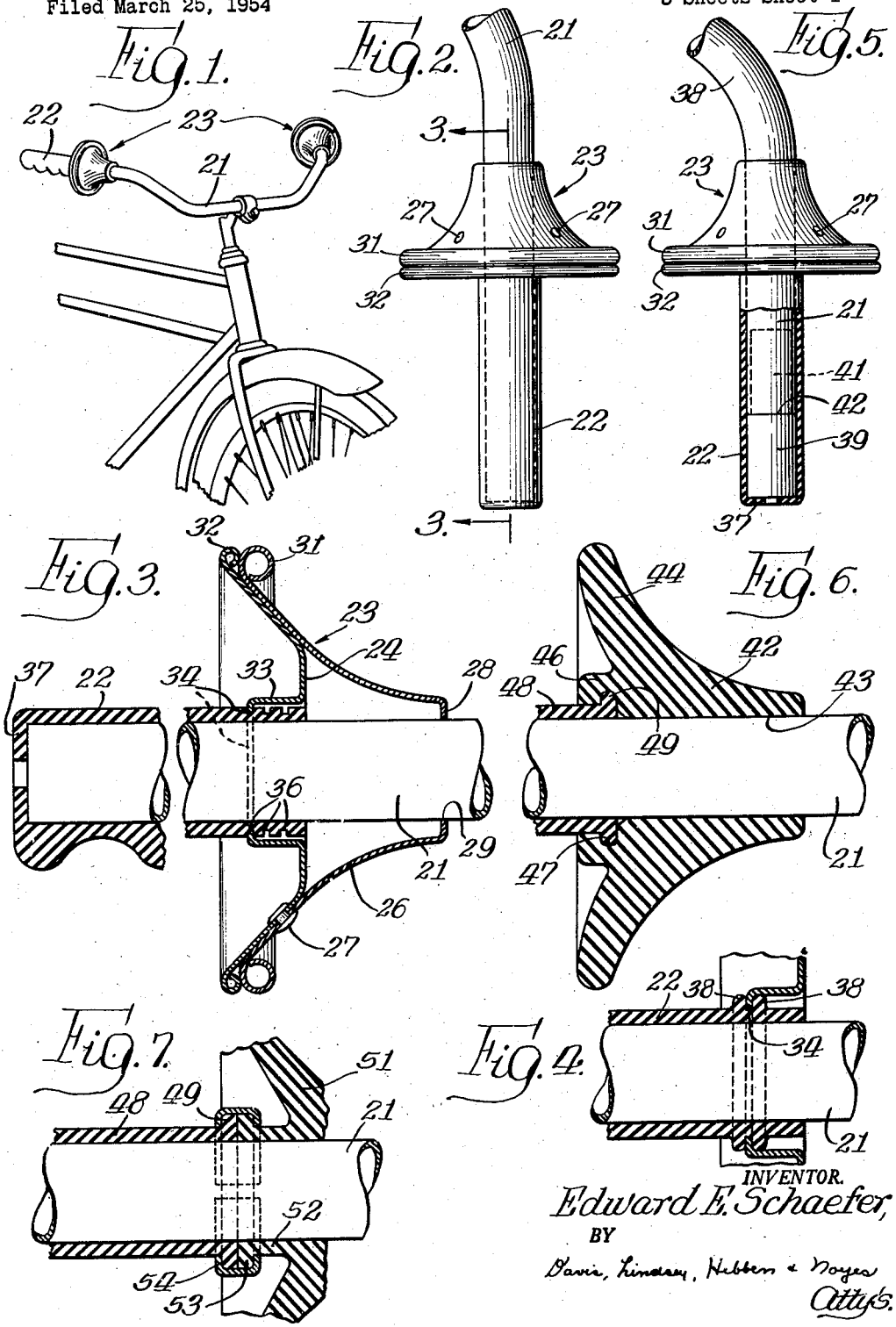
INVENTOR.
Edward E. Schaefer,
BY
Davis, Lindsey, Hibben & Noyes
Attys.

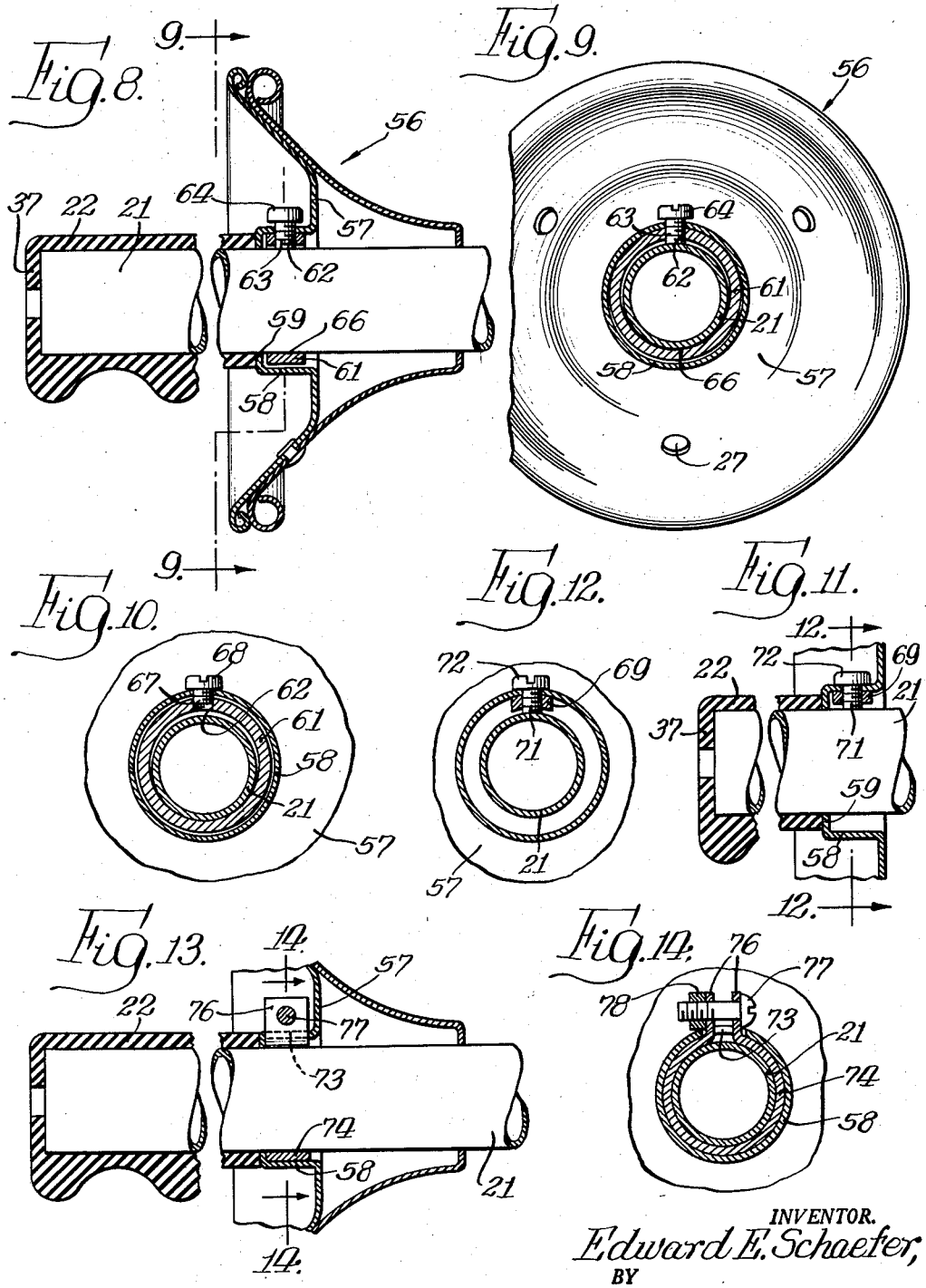

July 22, 1958  E. E. SCHAEFER  2,844,047
BICYCLE HANDLE BAR GUARD
Filed March 25, 1954  3 Sheets-Sheet 3
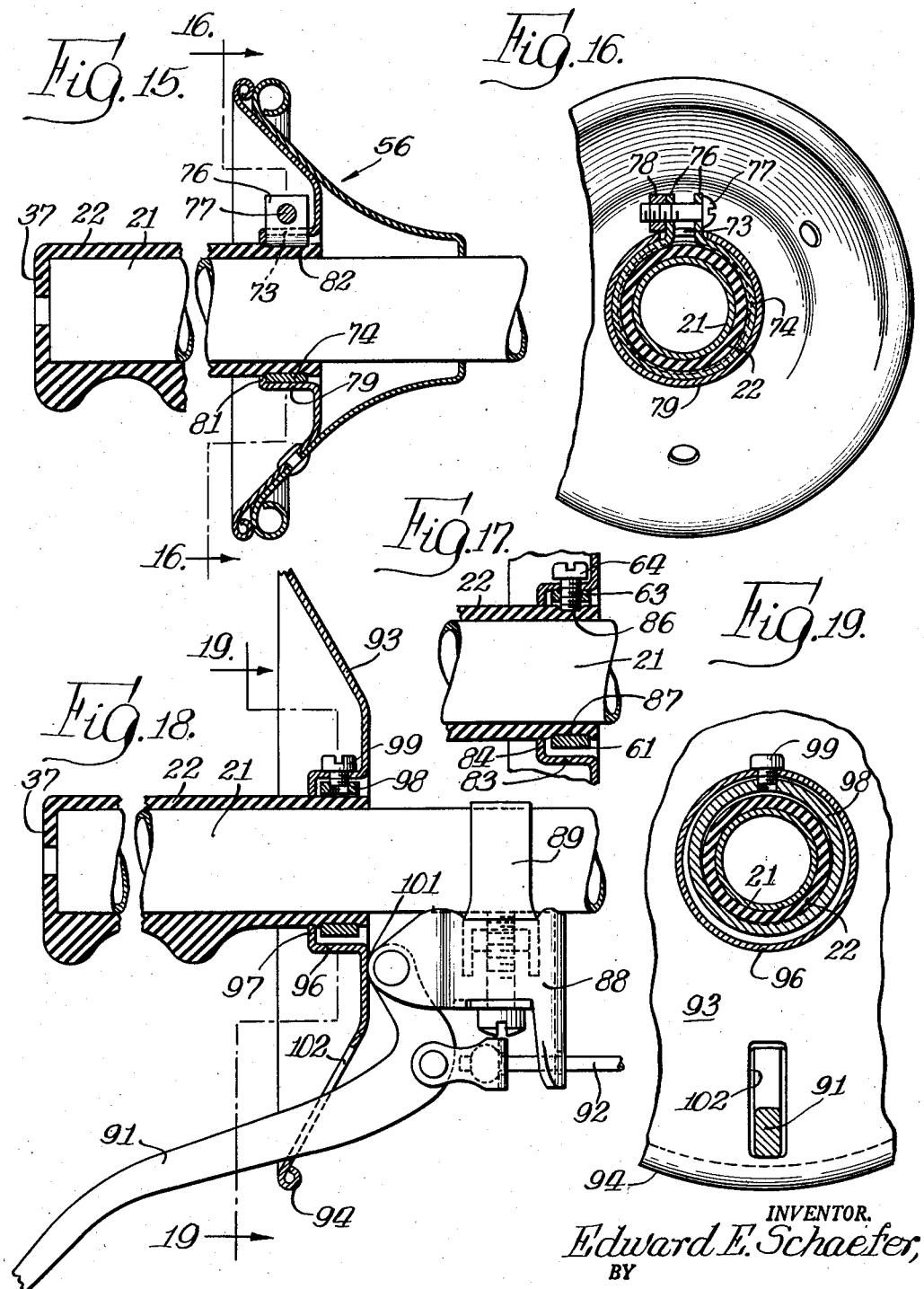

United States Patent Office 2,844,047
Patented July 22, 1958

2,844,047

BICYCLE HANDLE BAR GUARD

Edward E. Schaefer, River Forest, Ill., assignor to Wilmer B. Thompson, Quitman, Ga.

Application March 25, 1954, Serial No. 418,569

14 Claims. (Cl. 74—551.8)

This invention relates to a novel protective device or guard for use on the handle bars of bicycles or similar vehicles.

In connection with vehicles such as bicycles or tricycles or the like, I have found that there are several important respects in which improved safety measures should be provided, especially for the protection of children. For example, it frequently happens that when riding a bicycle or tricycle in close proximity to a wall or fence or the like, the child's hands are painfully scraped by rubbing against the wall or fence. Another instance of inadequate safety precautions on the conventional bicycle is found when the rider accidentally runs head-on into some obstacle or is otherwise brought to a sudden stop. When this occurs, there is a dangerous tendency for the rider's hands to slip and slide forwardly along the handle bars, often with the result that the rider is catapulted over the handle bars and perhaps injured. The ordinary rubber hand grip is not usually sufficient to prevent slippage of the rider's hands under such conditions.

According, a primary object of my invention is to provide a novel and improved safety device for use on the handle bars of bicycles or the like.

A further object of the invention is to provide a novel bicycle handle bar guard which serves to protect the hands of the rider from being scraped and also prevents the rider's hands from sliding forwardly along the handle bars upon sudden stopping of the vehicle.

Another object of the invention is to provide a novel device of the foregoing character which also serves to protect any mechanism or structure mounted on the handle bar in the event that the bicycle falls to the ground.

An additional object of the invention is to provide novel mounting means for rigidly securing a guard device to the handle bar of a bicycle or the like.

Still another object of the invention is to provide a novel combination of a hand grip and a guard for attachment to a bicycle handle bar.

Other objects and advantages of the invention will become apparent from the subsequent detailed description taken in conjunction with the accompanying drawings, wherein:

Fig. 1 is a fragmentary perspective view of a bicycle showing a pair of guards comprising one specific embodiment of the invention;

Fig. 2 is an enlarged elevational view of one handle portion of the bicycle with the guard mounted thereon;

Fig. 3 is an enlarged longitudinal sectional view as taken along the line 3—3 of Fig. 2;

Fig. 4 is a fragmentary sectional view showing a slight modification of a portion of the device shown in Fig. 3;

Fig. 5 is a view similar to Fig. 2 but partly in section to show an auxiliary device for use with short handle bars;

Fig. 6 is a sectional view showing another modification of the invention;

Fig. 7 is a fragmentary sectional view showing another modified form of the invention;

Fig. 8 is a view similar to Fig. 3 but showing a different embodiment of the invention;

Fig. 9 is a view, partly in section and partly in elevation, as taken along the line 9—9 of Fig. 8;

Fig. 10 is a fragmentary sectional view similar to Fig. 9 but showing a slight modification thereof;

Fig. 11 is a fragmentary sectional view similar to Fig. 8 but showing another modification of the invention;

Fig. 12 is a sectional view taken along the line 12—12 of Fig. 11;

Fig. 13 is a fragmentary sectional view of still another embodiment of the invention;

Fig. 14 is a transverse sectional view taken along the line 14—14 of Fig. 13;

Fig. 15 is a sectional view showing a slight modification of the embodiment illustrated in Figs. 13 and 14;

Fig. 16 is a fragmentary view, partly in elevation and partly in section, as taken along the line 16—16 of Fig. 15;

Fig. 17 is a fragmentary sectional view illustrating a modification of the embodiment shown in Figs. 8 and 9;

Fig. 18 is a side elevational view, partly in section, showing another embodiment of the invention especially adapted for use on bicycles having hand brakes or gear shift mechanism; and Fig. 19 is a fragmentary view, partly in elevation, and partly in section, as taken along the line 19—19 of Fig. 18.

Referring first to Fig. 1, the front end portion of a bicycle is shown having a handle bar 21 with the usual hand grips 22 of rubber, plastic, or other suitable rubber-like elastomer. A pair of circular radially extending guard devices 23 are mounted coaxially on the handle portions of the handle bar 21 and are rigidly held in fixed position on the handle bar by suitable means hereinafter described. As will be readily understood, the diameter of the guards 23 is large enough so that when the hands of the rider are on the hand grip 22 in the usual manner, the radially extending guards 23 will project beyond the rider's hands for protecting the same against accidental scraping by contact with a wall, fence, etc. Furthermore, it will also be seen that the guards 23 provide enlarged rigid abutments located forwardly of the rider's hands so as to prevent slipping or sliding of the hands forwardly along the handle bar in the event of a head-on collision with some external object. Thus, even if the force of the impact is such that the hands tend to slip off the hand grips 22, the guards 23 will serve to prevent forward bodily movement of the rider and thereby avoid many serious injuries and damage. It will also be seen that the radially extending guards 23 will serve to some extent to protect a brake or gear shift lever, a light, a horn or other device frequently mounted on the handle bar in the event that the bicycle falls to the ground.

In Figs. 2 and 3 one specific construction for the guard 23 is illustrated as well as one particular method of rigidly mounting the guard on the handle bar. In this instance, the guard 23 has a two-piece construction consisting of a rearwardly disposed dished disk member 24 and a forwardly disposed bell-shaped member 26 which fits against the dished disk 24 in generally nested relation therewith. The two members 24 and 26 are rigidly fastened together, as by a plurality of rivets 27. The forward end portion of the bell-shaped member 26 has an inwardly extending radial flange 28 with an aperture 29 having a snug sliding fit on the handle bar 21. The outwardly curved or flaring wall of the bell-shaped member 26 terminates in an annular curl or bead 31 for stiffening purposes. The corresponding peripheral edge of the dished disk member 24 is likewise reversely curled as at 32 and abuts the curled edge 31. The central dished portion of the disk 24 is formed with an integral rearwardly projecting axial hub or tubular extension 33 having a lip or inwardly extending radial flange 34 which seats snugly in one of a plurality of annular grooves 36 provided at the inner end of the hand grip 22. As is well known, a rubber or plastic hand grip 22 of the type shown has a tight frictional fit on the handle bar 21 so that rearward or outward movement of the guard 23 along the handle bar 21 is effectively prevented by the hand grip 22. Also, the outer substantially closed end portion or wall 37 of the hand grip 22 seats against the axial end of the handle bar 21 to prevent forward movement of the hand grip 22. Consequently, by reason of the engagement of the lip 34 in the groove 36, the entire guard 23 is rigidly held against forward movement along the handle bar 21.

Fig. 4 shows a slight modification wherein the inner end of the hand grip 22 is provided with a plurality of radially projecting and axially spaced ribs 38 instead of the inwardly extending grooves 36. The inturned lip or flange 34 on the guard 23 is received snugly between a pair of ribs 38 thereby interconnecting the hand grip 22 and the guard 23.

In mounting the above described forms of the invention on a handle bar 21, the open end of the hollow flexible grip 22 is first deflected or compressed and inserted into the central opening of the guard 23 before mounting the device on the bicycle. By manipulation of the flexible hollow hand grip 22, the lip or flange 34 on the guard 23 is frictionally seated in the appropriate groove 36 (in the case of the Fig. 3 embodiment) or in the space between the ribs 38 (in the case of the Fig. 4 embodiment). Thereafter, the preliminarily connected hand grip and guard are slid axially onto the handle bar 21 to the position shown in Fig. 3 with the end wall 37 of the hand grip abutting the axial end of the handle bar 21. With the hand grip 22 thus fitted snugly around the rigid handle bar 21, it will be seen that the hollow hand grip is thereby firmly held in distended relation and cannot possibly be collapsed inwardly. Thus, the lip 34 on the metal guard is firmly and rigidly connected to the hand grip 22 as long as the device is mounted on the handle bar 21.

Although in Figs. 1 to 3 the guard 23 is shown with a two-piece generally bell-shaped construction, it will be understood that various modifications of this arrangement may be utilized as long as there is a generally annular radially extending structure which is of sufficient diameter to provide lateral protection for the hands and also as a brace or abutment for resisting forward sliding movement of the rider's hands. As will hereinafter appear, a one-piece unit may frequently be employed. However, the arrangement shown in Fig. 3 wherein the flanges 34 and 28 are axially spaced provides a highly advantageous mounting with consequent resistance to lateral twisting or cocking of the guard on the handle bar.

In Fig. 5, I have shown the use of the guard 23 in conjunction with an auxiliary handle bar extension which is required in the case of certain types of bicycles. As will be readily apparent, in order for the guard 23 to be effective it must be mounted on the straight terminal end portion of the handle bar 21. In the event that this terminal end portion of the handle bar is not long enough to accommodate both the hand grip 22 and the guard 23, it is then necessary to extend the length of the terminal portion of the handle bar so that the guard 23 will clear the curved portion, as at 38, of the handle bar. The extension is in the form of a cylindrical plug or bar 39 having an end portion 41 of reduced diameter and defining a radial shoulder 42. The reduced end 41 of the extension 39 is inserted into the open end of the tubular handle bar 21 until the shoulder 42 seats against the outer end of the handle bar, the portion 41 preferably having a relatively snug frictional fit within the handle bar. Thereafter, the preliminarily connected guard 23 and hand grip 22 are slid onto the handle bar 21 and its extension 39 until the end wall 37 of the hand grip 22 seats against the outer end of the extension 39. In this manner, the guard 23 is rigidly located on the straight portion of the handle bar 21 and is prevented from extending on to the curved portion 38.

Fig. 6 illustrates a further modification of the invention wherein the radially extending guard is in the form of a one-piece body 42 of molded rubber or plastic having a central bore 43 and an outwardly flaring skirt portion 44. A short axial extension 46 is provided at the rearward end of the bore 43 and has an annular groove 47. The hand grip, designated at 48, has in this instance an end flange or bead 49 which is snugly received within the groove 47 of the guard for interconnecting the hand grip and the guard. As before, when the guard 42 and the hand grip 48 are mounted on the handle bar 21, the hollow hand grip 48 is held in distended position so that the flange 49 and groove 47 are in snug interfitting engagement to prevent forward movement of the guard 42 along the handle bar 21.

Fig. 7 illustrates a further modification of the Fig. 6 embodiment wherein a separate connecting element is used for interconnecting the hand grip and guard. Thus, the molded rubber or plastic body portion, designated at 51, of the guard has a short tubular axial extension 52 with an outwardly extending radial flange 53. The flange 53 seats against or abuts the flange 49 on the hand grip 48, and a split metal ring 54 of generally U-shaped cross section is fitted around the abutting flanges 49 and 53 for connecting the same together. As hereinbefore described, both the hollow handle grip 48 and the tubular extension 52 of the guard are held in completely distended relation when the device is mounted on the rigid handle bar 21 so that the flanges 49 and 53 are effectively retained in interconnected engagement within the connecting ring 54.

In each of the foregoing embodiments of the invention, it will be seen that there is a positive interconnection between the hand grip and the guard so that the guard is held rigidly in position on the handle bar primarily by the coaction of the grip with the handle bar. However, it is also within the scope of my invention to provide a direct rigid connection between the guard and the handle bar without reliance on the grip for preventing axial movement of the guard. In Figs. 8 to 14 I have shown several ways in which this result may be accomplished.

Thus, in Figs. 8 and 9 the guard is designated generally at 56 and has a structure which is very similar to that of the guard 23 heretofore described in connection with Figs. 2 and 3. However, in this case the dished disk member, indicated at 57, with the axial tubular extension, indicated at 58, has an inwardly extending radial flange 59 which fits in snug sliding relation on the handle bar 21, and the hand grip 22 mounted on the handle bar 21 merely butts against the flange 59. For rigidly attaching the guard 56 to the handle bar 21, I provide an annular element or locking ring 61 which fits around the handle bar 21 with slight clearance therebetween and is also received substantially concentrically in the annular space between the tubular extension or hub 58 and the handle bar 21. The ring 61 has a threaded aperture 62, and a screw 63 having a head portion 64 extends radially through the tubular extension or hub portion 58 and also in threaded engagement through the aperture 62 in the ring 61. The screw 63 is of sufficient length so that when the inner end thereof engages the handle bar 21, the head portion 64 is spaced from the tubular extension 58. By further tightening the screw 63, it will be seen that the coaction of the inner end of the screw against the handle bar 21 and its threaded engagement with the ring 61 will cause the latter to be drawn radially until the ring snugly embraces the handle bar 21, as at 66, at a point diametrically opposite to the screw 63. If desired, the screw 63 can be tightened sufficiently so that the ring 61 is actually distorted to a somewhat oval shape and thereby increasing the gripping area between the ring and the handle bar 21. With the ring 61 thus securely attached to the handle bar 21 and with the screw 63 interlocking the guard 56 to the ring 61, it will be evident that the guard is effectively mounted in fixed relation on the handle bar 21 without reliance on the retaining power of the hand grip 22.

Fig. 10 illustrates a modification of the foregoing wherein the locking screw is designated at 67 and has a head portion 68. In this case, the screw 67 is engaged in the threaded aperture 62 of the ring 61 but is relatively short so that it does not seat at its inner end against the handle bar 21. However, the head portion 68 of the screw 67 seats against the outside of the tubular extension 58 and upon tightening of the screw, the ring 61 is drawn radially into tight frictional engagement with the handle bar 21 by reason of the coaction of the screw head 68 with the tubular hub 58 and the threaded engagement of the screw with the ring. Dependent upon the relative structural strength in the various parts, continued tightening of the screw may result in distortion of the ring 61 or of the tubular hub 58 or both so as to increase the locking effect.

Figs. 11 and 12 show a still further modification of this same principle. In this case, instead of a locking ring, a curved nut 69 is employed between the handle bar 21 and the tubular hub 58, and a screw 71 with a head portion 72 extends radially through the hub and in threaded engagement through the nut 69 into endwise engagement with the handle bar 21. Upon tightening of the screw 71, the end of the screw is forced against the handle bar 21 and at the same time the nut 69 is urged outwardly against the inside of the hub 58. In this form of the invention, the guard is held against axial movement along the handle bar 21 by the frictional pressure of the screw 71 against the handle bar 21 and also by the frictional engagement of the flange 59 with the handle bar 21.

In Figs. 13 and 14 a further modification of the locking ring principle is illustrated. In this case the tubular extension or hub portion 58 of the guard has a slot 73, and a split clamping ring 74 encircles the handle bar 21 and has a pair of outwardly bent ears 76 which project through the slot 73. A screw or bolt 77 with a nut 78 coact with the ears 76 for tightening the ring 74 in rigid fixed relation on the handle bar 21. The ears 76 which project through the slot 73 in the hub portion of the guard serve to prevent axial movement of the guard along the handle bar.

Figs. 15 to 17 illustrate a combination of both of the principles hereinbefore described, i. e. a means for directly locking the guard on the handle bar and at the same time interconnecting the guard with the hand grip. Thus, Figs. 15 and 16 show the same general arrangement illustrated in Figs. 13 and 14, but in this instance the hub portion or tubular extension of the guard, designated at 79, has a somewhat larger diameter and the inner end of the hand grip 22 extends through an apertured end flange 81 and in between the split clamping ring 74 and the handle bar 21. When the ring 74 is tightened by means of the nut and bolt 77—78, the hand grip 22 will be compressed slightly, as at 82, by the clamping action of the ring 74. Consequently, the clamping ring 74 rigidly secures the hand grip 22 to the handle bar 21 as well as to the guard 56.

Fig. 17 is a modification of the embodiment of the invention heretofore described in connection with Figs. 8 and 9. The hub portion of the guard is again enlarged somewhat, as at 83, and has a flange portion 84 with an aperture large enough to receive the inner end of the hand grip 22 in the same general manner as shown in Figs. 15 and 16. The locking ring 61 encircles the end of the hand grip 22, and the screw 63 at its inner end digs into the hand grip 22. Also, as the screw 63 is tightened, the locking ring 61 will likewise cause compression of the hand grip 22, as at 87.

Figs. 18 and 19 show a somewhat different embodiment of the invention as used in connection with a bicycle having a pivotal hand lever mounted on the handle bar for actuating a brake or gear shift. Thus, a hand lever support 88 is rigidly fastened by a clamp means 89 to the handle bar 21 and has a rearwardly extending pivotal lever 91 for actuating an operating cable 92. As will be readily understood, the hand lever 91 is positioned closely adjacent the hand grip 22 to be operated by the fingers of the rider without removing his hand from the hand grip. The guard in this case comprises a radially extending dished disk 93 having a reversely curled peripheral edge 94 and an axial tubular extension 96 with an apertured flange 97. The guard disk 93 is rigidly secured to the handle bar 21 by any suitable locking arrangement of the type heretofore described. For the sake of illustration, an arrangement similar to that shown in Fig. 10 is illustrated and comprises a locking ring 98 and a screw 99 extending into threaded engagement with the ring 98. In this instance, the ring 98 is shown as snugly encircling the end of the rubber hand grip 22 as well as the handle bar 21. The disk 93 also seats against the brake or gear shift mechanism 88, as at 101, for increasing the lateral stability of the guard. For accommodating the pivotal hand lever 91, the skirt of the dished disk 93 has an elongated radial slot 102 through which the lever 91 extends, the slot 102 being long enough to accommodate pivotal movement of the lever 91. In addition to the protective or safety features herein before described, it will also be seen that the guard disk 93 in this embodiment of the invention serves to protect the brake or gear shift lever and its mounting from damage in the event that the bicycle falls to the ground.

Although the invention has been described in connection with certain specific structural embodiments thereof, it will be understood that various modifications and alternative structures may be resorted to without departing from the scope of the invention as defined in the appended claims.

I claim:

1. In combination, a tubular hand grip of flexible material having a substantially closed end and an open end and adapted to be fitted on a vehicle handle bar with said substantially closed end seating against the end of the handle bar, a centrally apertured radially extending guard member adapted to be mounted on the handle bar adjacent the inner end of said grip, and locking means providing a detachable connection between adjacent portions of said grip and said guard member, said flexible grip being retained in distended non-collapsible relation when positioned on the handle bar whereby to prevent detachment of said locking means and thereby retaining the guard member against axial movement on the handle bar.

2. In combination, a hand grip adapted to fit over the end of a vehicle handle bar, a centrally apertured guard member adapted to be mounted on the handle bar adjacent the inner end of said grip and extending radially from the handle bar, and a tubular hub portion extending axially from said guard member and having a terminal inwardly extending radial flange portion, the inner end portion of said grip being provided with an annular groove and said flange portion being detachably receivable in interlocking relation in said groove for retaining the guard member against axial movement on the handle bar.

3. In combination, a hand grip adapted to fit over the end of a vehicle handle bar, a centrally apertured guard member adapted to be mounted on the handle bar adjacent the inner end of said grip and extending radially from the handle bar, said grip and said guard member each comprising a one-piece body of rubber-like material, an integral tubular hub extending axially from said guard member and having an annular groove at its inner periphery, and an outwardly turned radial flange portion at the inner end of said grip adapted to interlock in detachable relation with the groove on said hub for retaining the guard member against axial movement on the handle bar.

4. In combination, a hand grip adapted to fit over the end of a vehicle handle bar, a centrally apertured guard member adapted to be mounted on the handle bar adjacent the inner end of said grip and extending radially from the handle bar, said grip and said guard member each comprising a one-piece body of rubber-like material, an integral tubular hub extending axially from said guard member, a pair of axially abutting outwardly extending radial flange portions at the adjacent ends of said grip and said hub, and a resilient annular locking member adapted to fit around said flange portions for detachably connecting the same together whereby to retain the guard member against axial movement on the handle bar.

5. A protective device for use on a vehicle handle bar comprising a centrally apertured guard member adapted to be mounted on the handle bar in radially extending relation adjacent the rider's hand and forwardly thereof, tubular means extending axially from said member and spaced from the handle bar to provide an annular clearance space therebetween, and releasable locking means comprising an annular member disposed in said clearance space, adjustable means for drawing said annular member into tight frictional engagement with the handle bar, and abutment means projecting radially from said annular member through said tubular means for retaining the guard member against axial movement on the handle bar.

6. A protective device for use on a vehicle handle bar comprising a guard structure having a generally disk-shaped portion, a centrally apertured axial hub on said disk-shaped portion adapted to have the handle bar extend therethrough, and releasable locking means rigidly engaging the handle bar and said hub for retaining the guard structure against axial movement on the handle bar, said locking means comprising a ring disposed substantially concentrically between the handle bar and the hub, and a tightening screw extending radially through said hub and threadedly engaged with said ring at one side thereof for drawing the opposite side of the ring into frictional engagement with the handle bar.

7. The device of claim 6 further characterized in that said screw has an outer head portion and a threaded shank portion of sufficient length so that the inner end of the screw engages the handle bar and the head portion of the screw remains spaced from said hub.

8. The device of claim 6 further characterized in that said screw has an outer head portion engaging said hub and a threaded shank portion of restricted length such that the screw does not extend through the ring into engagement with the handle bar.

9. A protective device for use on a vehicle handle bar comprising a guard structure having a generally disk-shaped portion, a centrally apertured axial hub on said disk-shaped portion adapted to have the handle bar extend therethrough, and releasable locking means for rigidly engaging the handle bar and said hub for retaining the guard structure against axial movement on the handle bar, said locking means comprising a tightening screw extending radially through the hub into engagement at its inner end with the handle bar and a nut threadedly carried on the screw and engageable with the inside of said hub upon tightening of the screw whereby to draw the hub into tight frictional engagement with the handle bar.

10. A protective device for use on a vehicle handle bar comprising a guard structure having a generally disk-shaped portion, a centrally apertured axial hub on said disk-shaped portion adapted to have the handle bar extend therethrough, and releasable locking means for rigidly engaging the handle bar and said hub for retaining the guard structure against axial movement on the handle bar, said locking means comprising a split clamping ring encircling the handle bar, radially extending ears projecting from said ring through the hub, and adjustable means for drawing said ears toward each other for rigidly clamping the ring on the handle bar.

11. A protective device for use on a vehicle handle bar comprising a guard structure having a generally disk-shaped portion, a centrally apertured axial hub on said disk-shaped portion adapted to have the handle bar extend therethrough, said hub having a slot in the wall thereof, and releasable locking means adapted to be rigidly clamped to the handle bar and having a rigid portion extending radially through said slot for retaining the guard structure against axial movement on the handle bar.

12. In combination, a hand grip adapted to fit over the end of a vehicle handle bar, a centrally apertured guard member adapted to be mounted on the handle bar adjacent the inner end of said grip and extending radially from the handle bar, a tubular hub portion extending axially from said guard member and receiving the inner end of said grip, and annular locking means surrounding the grip and the handle bar within said hub portion for detachably securing the grip on the handle bar, said locking means having a rigid member projecting radially through said hub portion for retaining the guard member against axial movement on the handle bar.

13. The structure of claim 12 further characterized in that said locking means comprises a split clamping ring having ears projecting radially through the hub portion and adjustable means coacting with said ears for tightening the clamping ring.

14. The structure of claim 12 further characterized in that said locking means comprises a locking ring and a tightening screw extending radially through said hub portion and threadedly engaged with the ring for drawing the latter into tight frictional engagement with said grip and the handle bar.

References Cited in the file of this patent

UNITED STATES PATENTS

| 568,024 | Gorman | Sept. 22, 1896 |
| 599,359 | Rockwell | Feb. 22, 1898 |
| 1,112,294 | Kepler | Sept. 29, 1914 |
| 1,122,971 | Mayer | Dec. 29, 1914 |
| 1,214,032 | Heineck | Jan. 30, 1917 |
| 2,132,570 | Leone | Oct. 11, 1938 |
| 2,344,545 | Harder | Mar. 21, 1944 |
| 2,414,247 | Thompson | Jan. 14, 1947 |

FOREIGN PATENTS

| 4,190 of 1883 | Great Britain | Aug. 30, 1883 |
| 2,382 of 1897 | Great Britain | Jan. 29, 1897 |
| 13,884 of 1904 | Great Britain | June 20, 1904 |
| 132,962 | Great Britain | Oct. 2, 1919 |
| 290,788 | Italy | Nov. 28, 1931 |
| 405,958 | France | Nov. 27, 1907 |
| 430,157 | Italy | Feb. 12, 1948 |